United States Patent [19]

Dola

[11] Patent Number: 4,606,595
[45] Date of Patent: Aug. 19, 1986

[54] PREMISE WIRING SYSTEM AND COMPONENTS THEREFOR

[75] Inventor: Frank P. Dola, Hudson, Fla.

[73] Assignee: AMP Incorporated, Harrisburg, Pa.

[21] Appl. No.: 603,803

[22] Filed: Apr. 25, 1984

[51] Int. Cl.$^4$ .............................................. H01R 4/24
[52] U.S. Cl. ................................ 339/99 R; 339/97 P; 339/176 MF; 339/206 R
[58] Field of Search .............. 174/117 F; 339/17 F, 339/176 MF, 176 M, 206 R, 206 P, 97 P, 98, 99 R

[56] References Cited

U.S. PATENT DOCUMENTS

| | | | |
|---|---|---|---|
| 2,950,338 | 8/1960 | Taylor | 174/117 F |
| 3,034,091 | 5/1962 | Gluck | 339/17 F |
| 3,820,055 | 6/1974 | Huffnagle et al. | 339/17 F |
| 4,058,704 | 11/1977 | Shimizu | 174/117 F |
| 4,075,758 | 2/1978 | Parsons et al. | 339/99 R |
| 4,186,988 | 2/1980 | Kobler | 339/176 MP |
| 4,193,654 | 3/1980 | Hughes et al. | 339/17 LC |
| 4,286,835 | 9/1981 | Adams et al. | 339/122 R |
| 4,420,221 | 12/1983 | Ledbetter | 339/98 |
| 4,442,594 | 4/1984 | Narozny | 339/99 R |
| 4,488,768 | 12/1984 | Sigmon | 339/99 R |
| 4,533,195 | 8/1985 | Knickerbocker | 339/97 P |

*Primary Examiner*—John McQuade
*Attorney, Agent, or Firm*—Russell J. Egan; Robert W. Pitts

[57] ABSTRACT

A premise wiring system for telephones and the like is formed by a three-wire flat cable one end of which is terminated by a plug, the cable having at least one jack connected thereto at a position spaced from the plug and possibly a splice joining cable segments. Both the plug and jack are configured to have first and second terminals each terminal having a mating first end and an oppositely-directed insulation-piercing conductor-engaging second end with the second end of the first terminals configured to engage the outer conductors of the cable while the second end of the second terminal is configured to engage only the center conductor of the cable so that, regardless of the changes in direction imparted to the cable, the plug jack and splice can be terminated thereon effecting proper connection regardless of orientation. The splice is similarly configured but contains three double-ended terminals which engage like conductors of adjacent cable segments.

18 Claims, 8 Drawing Figures

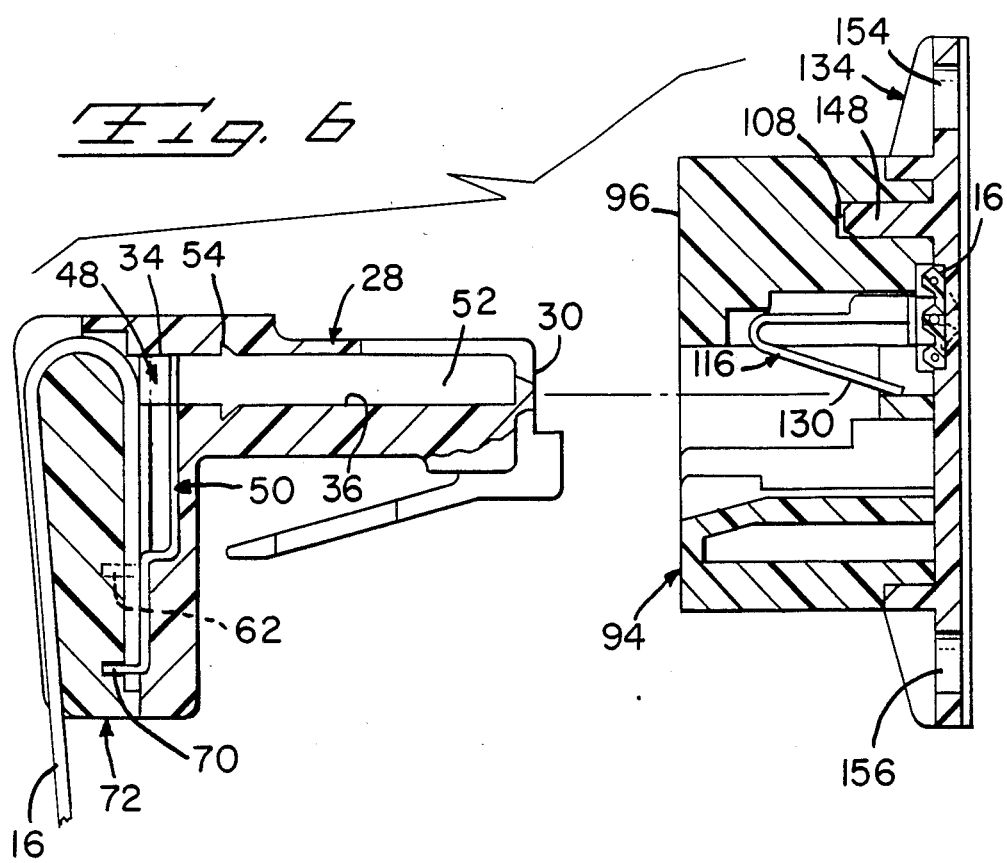
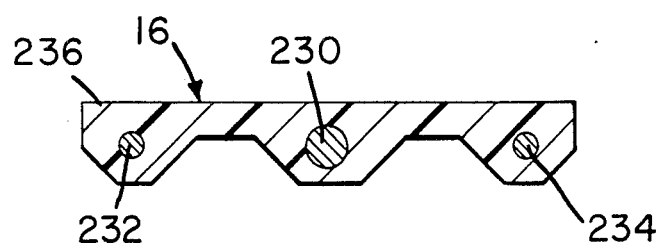

PREMISE WIRING SYSTEM AND COMPONENTS THEREFOR

The present invention relates to a system for providing on-premises wiring for telephone systems and the like and, in particular, to a system and appliances which can be surface mounted thereby obviating the need for snaking wires and skilled technicians for installation.

The recent changes in the telephone systems in the United States have created the opportunity for individual building owners to create their own on-premises wiring for telephones and the like. This allows the owner to customize his building by putting telephone outlets at any desired location. Heretofore this could be accomplished but required a skilled technician to snake wires through walls, conduits or the like, and make all of the necessary interconnections.

In my earlier co-pending application, Ser. No. 445,128 filed Nov. 29, 1982, and now abandoned, I described a system for providing on-premises wiring for burglar alarms and the like. At the time I suggested that the two-wire system disclosed therein could be used for telephone systems. This has proven not to be the case in that telephone wiring has some unique features. While telephone wiring traditionally utilizes a two-wire system, the wires are designated as ring and tip and must always be connected in this relationship. Problems are created when the twin line ring-tip cable is bent at right angles in the plane of the cable. This can be visualized by considering two parallel conductors coming down a wall and then turning in either direction, for example, to the left or right along the base of the wall. It will readily be appreciated that in this situation a turn in one direction will have the ring wire on top while a turn in the opposite direction has the tip conductor on top. This would therefore cause great confusion to an unskilled installer in attempting to wire a premises for telephones in that he would have to have his junction box right-side-up or inverted according to how the wire has been turned between the main interconnect and the desired site for a tap.

The present invention overcomes the difficulties and confusions which might be caused in attempting to provide premises telephone wiring with a two-wire system. The subject invention utilizes a three-wire cable wherein the outer conductors have a total cross-sectional area equal to that of the central conductor. The conductors are preferably secured in parallel spaced configuration by a clear, insulative, profiled material provided with an adhesive backing. The individual system is completed by at least on jack and at least one plug, each of which includes a two-piece housing of insulative material defining a mating face, an oppositely directed cable passage and receiving therein at least two insulation displacing terminals one of which is adapted to engage the ring conductor and the other to engage both tip conductors, with each terminal having the opposite end profiled for mating with an appropriate member.

The present invention will now be described by way of example with reference to the accompanying drawings in which:

FIG. 6 is a transverse section through an unmated plug and jack according to the present invention;

FIG. 7 is an exploded perspective view of a splice according to the present invention; and FIG. 8 is an enlarged section through a cable according to the present invention.

Figure 1:
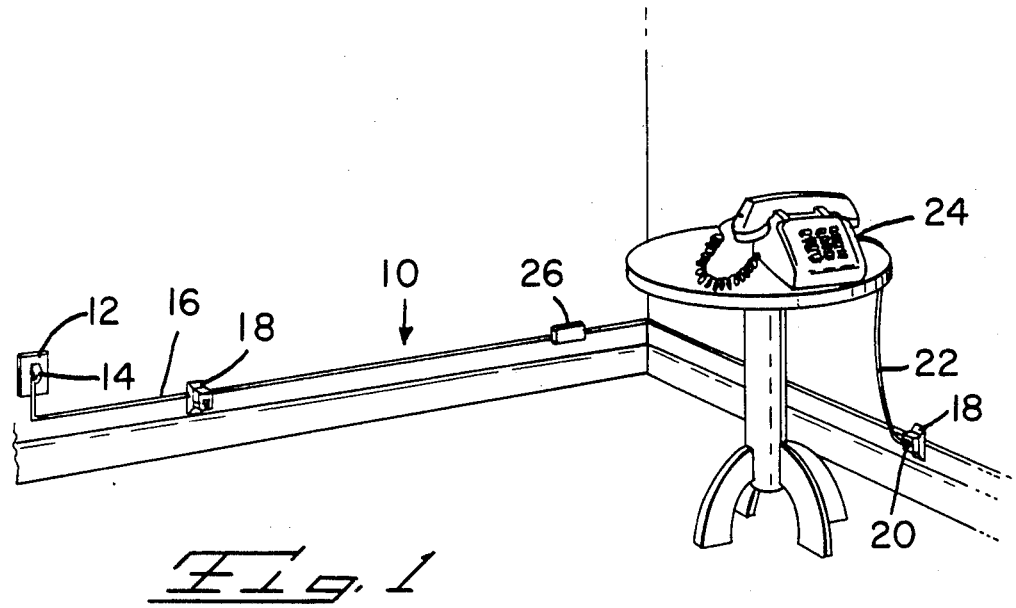
FIG. 1 is a perspective view of an interior room showing a typical premises wiring telephone installation utilizing the present invention.
Figure 2:
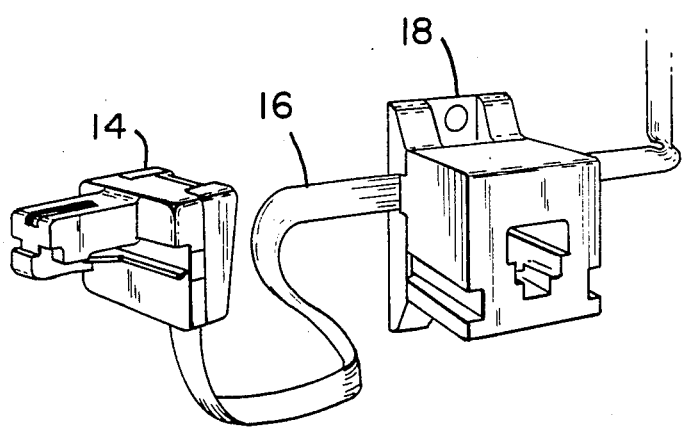
FIG. 2 is a perspective view of an end portion of a cable, a plug, and jack in accordance with the present invention.
Figure 3:
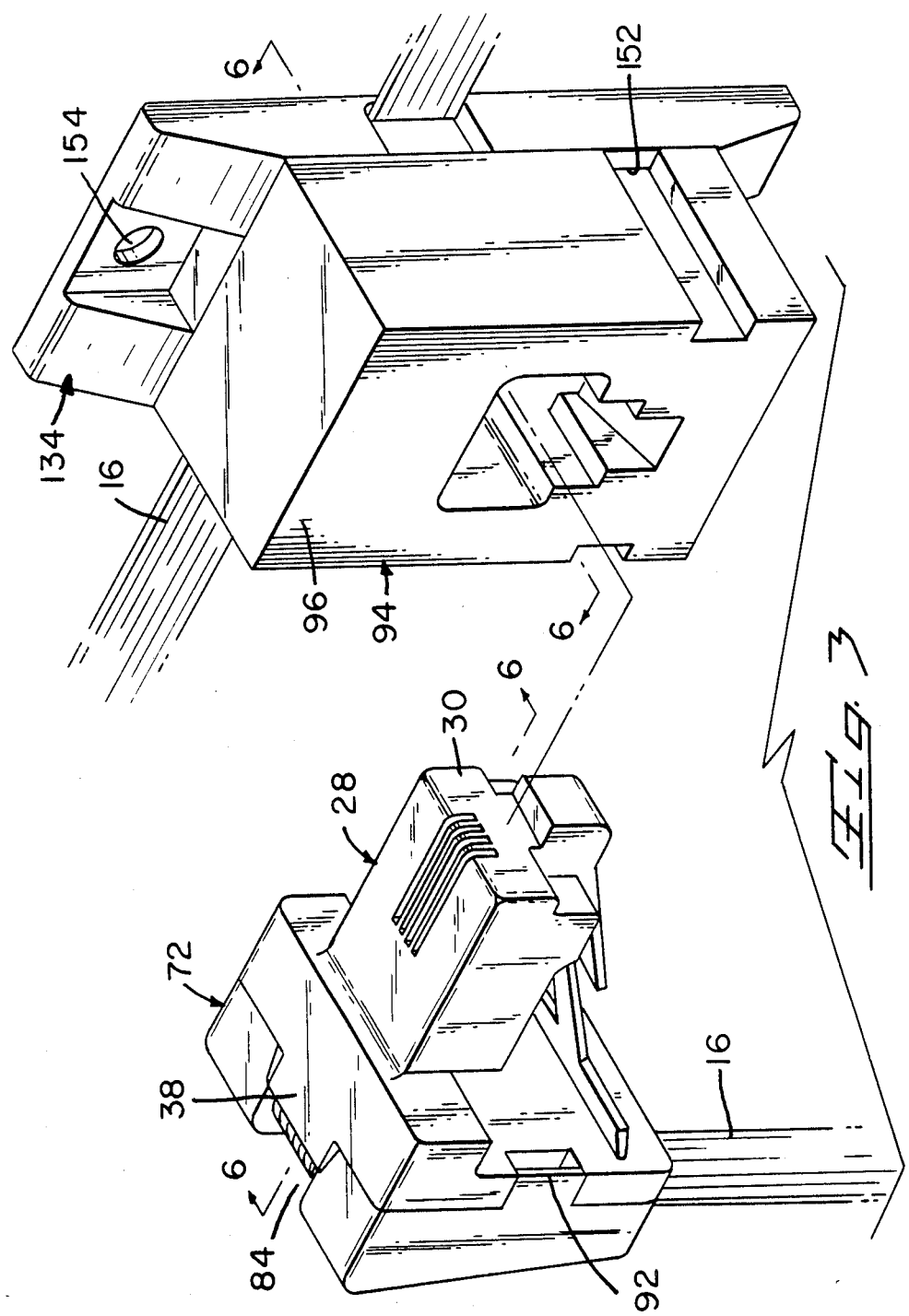
FIG. 3 is a perspective view of the subject jack and plug in an exploded or unmated condition.

The subject premises wiring system 10 is schematically illustrated in FIG. 1 with a wall jack 12, a plug 14 mated with the wall jack 12 and attached to a cable 16 which is laid out around the room with at least one cable jack 18 attached to the cable. At one location a plug 20 attached to one end of a cable 22, the other end of which is attached to a telephone 24, is mated with a jack 18. At one point cable segments are joined by a splice 26. The primary components of the subject invention, namely the plug 14, cable 16, cable jack 18, and splice 26 are shown in detail in FIGS. 2 to 8.

Figure 4:
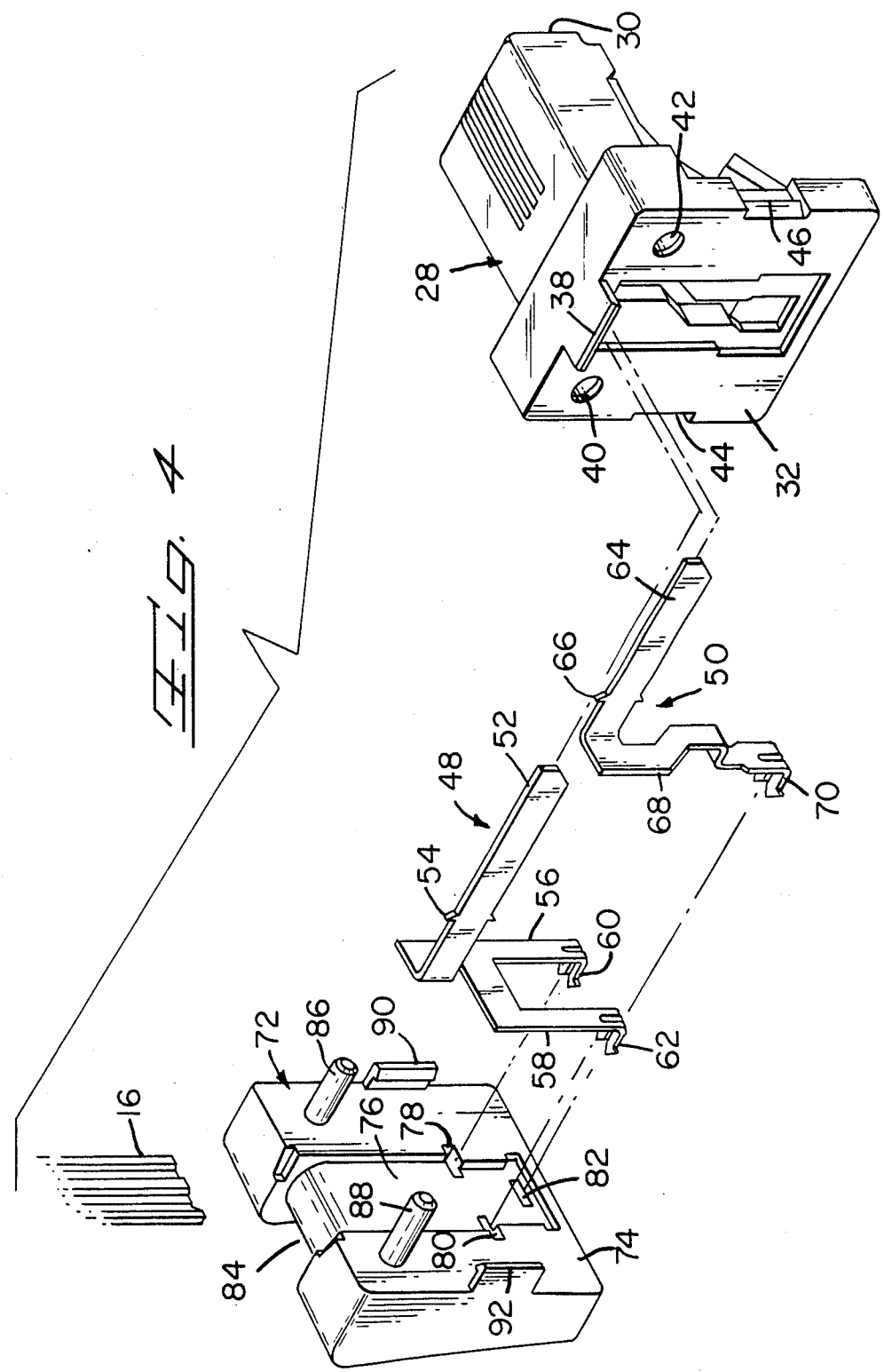
FIG. 4 is an exploded perspective view of a plug according to the present invention.

The plug 14 is shown in exploded condition is FIG. 4 and includes a front housing 28 of rigid insulative material having a profiled mating end 30 and an oppositely-directed rear face 32. First and second terminal cavities 34, 36 extend between the mating end 30 and the rear face 32 and are profiled at the rear face as shown in FIG. 6. The front housing 28 also has a cable directing flange 38 at one end of rear face 36, a pair of apertures 40, 42 in the rear face 32, and a pair of latching lugs 44, 46 on the sides of the rear face 32. First and second terminals 48, 50 are profiled to be received in the respective cavities 34, 36. Terminal 48 includes a blade portion 52 having retention tines 54 extending therefrom and a pair of parallel arms 56, 58 extending normal to both the plane of the blade 52 as well as its axis. Each arm 56, 58 has an insulation displacing slotted configuration 60, 62, respectively, extending normal to the free end thereof. The other terminal 50 has a blade 64, latching tines 66 and arm 68 with an insulation displacing slotted plate configuration 70 on the free end thereof. The rear cover 72 is likewise formed of rigid insulative material and has a cable receiving face 74 with a blind cable groove 76 having slots 78, 80, 82 near the blind end of the groove 76, each slot being positioned to receive a respective insulation displacing portion 60, 62, 70 of a respective terminal 48, 50 therein. The rear cover 72 also includes a cable directing end profile 84, a pair of mounting studs 86, 88, and a pair of latching arms 90, 92.

The plug 14 is assembled as one might expect. The terminals 48, 50 are inserted into their respective cavities 34, 36 with the blades 52, 64 being exposed at the mating end 30 and the insulation displacing portions 60, 62, 70 exposed from the rear face 32 of the front housing 28. The cable 16 is placed in the groove 76 of the rear cover 72 which is then applied to the front housing 28 by inserting the studs 86, 88 into the respective apertures 40, 42. This causes the conductors of the cable 16 to be engaged by the respective terminals as well as to secure the cover 72 to the front housing 28 by engagement of the latching arms 90, 92 with lugs 44, 46, and the profiling of the cable 16 in end 84 by flange 38.

Figure 5:
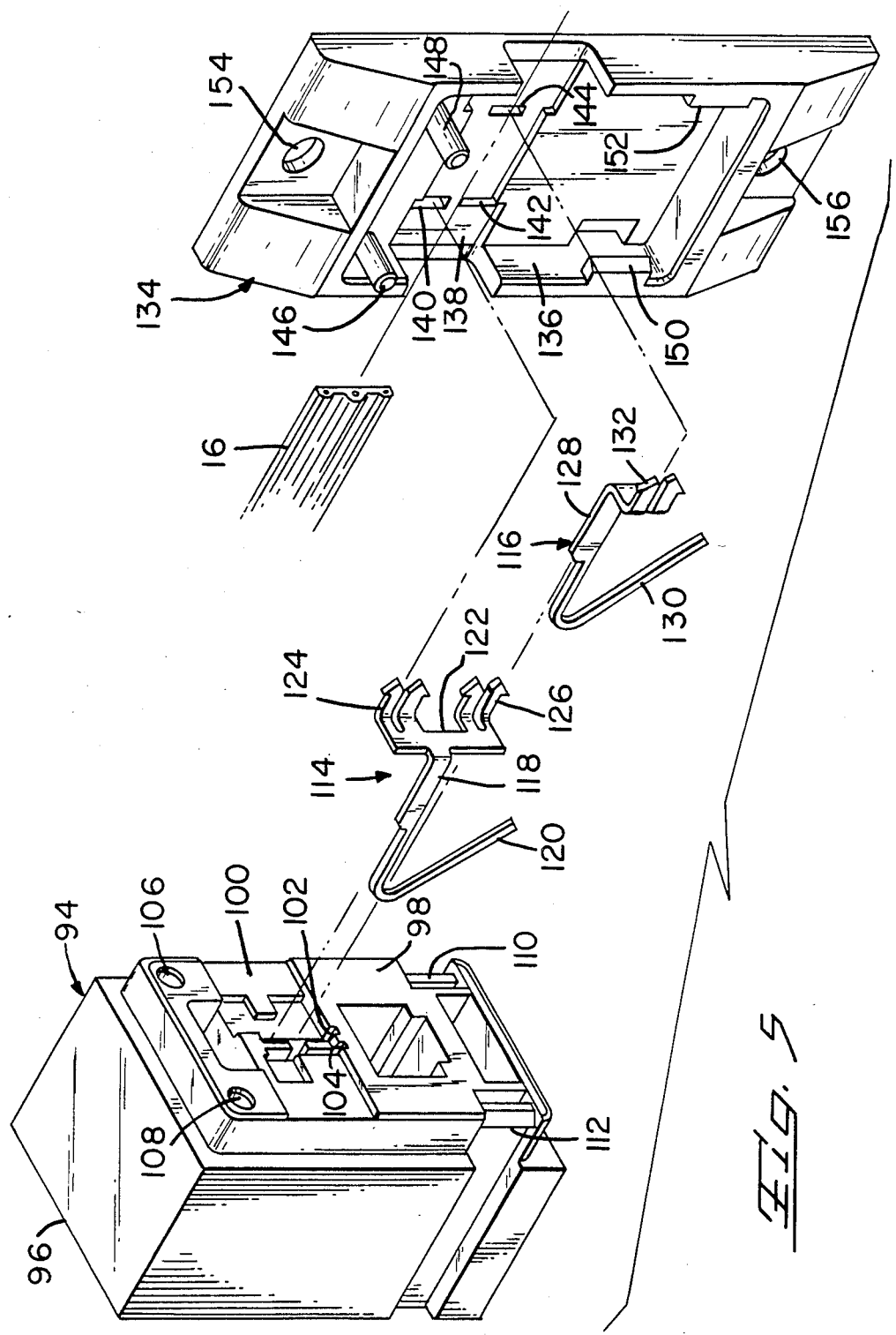
FIG. 5 is an exploded perspective view of a jack according to the present invention.

The jack 18 is shown in exploded perspective view in FIG. 5 and comprises a front housing 94 of rigid insulative material defining a front mating face 96 and a profiled rear face 98. Cable groove 100 extends transversely across the rear face 98 of the front housing 94. Terminal slots 102, 104 extend between the mating face 96 and the cable groove 100. The rear face 98 also includes apertures 106, 108 and the front housing 94 has a pair of latching arms 110, 112. A pair of first and second terminals 114, 116 are profiled to be received in the respective terminal slots 102, 104. The first terminal 114 has a body 118 an end of which is profiled with a folded blade configuration 120. The opposite end of the body 118 has a transverse arm 122 at the ends of which are upstanding profiled insulation displacing slotted plate configurations 124, 126. The second terminal 116 is somewhat similar in that it has a body 128 with a folded blade portion 130 and a single insulation displacing conductor-engaging slotted plate configuration 132. The back cover 134 is also of rigid insulative material and defines a cavity 136 which receives the front housing 94 therein. A transversely extending cable groove 138 intersects the cavity and contains slots 140, 142, 144, each aligned to receive a respective slotted plate portion 124, 126, 132 of terminals 114, 116. The back cover 134 also includes integral studs 146, 148, latching shoulders 150, 152, and mounting apertures 154, 156.

The assembly of a jack 18 is readily understood by those skilled in the art. The terminals 114, 116 would be inserted into their respective slots 102, 104 so that the portions 120, 130 are exposed at the mating face 96 and the insulation displacing portions 124, 126, 132 lie exposed in the cable groove 100. The rear cover 134 carrying the cable 16 therein in groove 138 receives the rear surface 98 of the front housing 94 with studs 146, 148 being received in apertures 106, 108 and latching arms 110, 112 engaging shoulders 150, 152. This action will drive the slotted plate portions 124, 126, 132 of the terminals 114, 116 into the respective conductors of the cable 16 to effect termination. The thus assembled jack can be mounted on a wall, panel, or the like, either by mounting means (not shown) passing through apertures 154, 156 or by adhesive means (also not shown) on the back of the cover 134.

FIG. 6 shows a transverse section through a plug 14 and a jack 18, each terminated to a respective cable 16, and illustrates how they would be aligned and mated. This mating feature is conventional as shown in, for example, U.S. Pat. Nos. 4,186,988 and 4,193,654. The mating profiles of both the plug 14 and the jack 18 are preferably of an industry standard.

FIG. 7 shows a splice 26 which would be used to interconnect lengths of cable 16. The splice 26 has a back housing 158 of rigid insulative material which defines a pair of oppositely directed, blind cable grooves 160, 162, each having three slots 164, 166, 168, 170, 172, 174 therein. The back housing also has apertures 176, 178, latching shoulders 180, 182, and can be provided with wall or panel mounting means (not shown). Double ended terminals 184, 186, 188 each have body portions 190, 192, 194 with mounting members 196, 198, 200 and oppositely directed slotted plate portions 202, 204, 206, 208, 210, 212. The cover 214 is formed of rigid insulative material and defines terminal receiving recesses 216, 218, 220, mounting studs 222, 224, and latching arms 226, 228.

The splice 26 would be assembled much in the manner of the above discussed plug 12 and jack 18. The terminals 184, 186, 188 would be mounted in their respective recesses 216, 218, 220. Ends of cables 16 would be placed in grooves 160, 162 and the cover 214 applied with studs 222, 224 entering apertures 176, 178 and latching arms 226, 228 engaging shoulders 180, 182. This drives the slotted plate portions 202, 204, 206, 208, 210, 212 into the cables 16 to terminate the respective conductors.

FIG. 8 shows a cross-section through a cable 16 according to the present invention. It will be noted from this FIG. that the center conductor 230 has a cross-sectional area which is substantially equal to the total cross-sectional area of the outer conductors 232, 234, preferably 0.0201 inch or 24 gage and 0.0142 inch or 27 gage. The conductors can also be either solid or stranded. This cable is preferably formed by an extrusion process with the insulation 236 preferably being a transparent PVC or similar plastic providing two advantages, namely ease of termination by allowing the conductors to be visually inspected when the termination is effected, and second, and perhaps most important to the homeowner, it tends to conceal the cable by allowing the color of the underlying surface (which could even be patterned wallpaper) to show through. The cable is also preferably provided with an adhesive backing selected from any one of the many adhesives available.

The illustrated cable profile has also been found to be particularly useful in maintaining alignment of the conductors as the insulation is extruded to form the cable.

It will be appreciated from the foregoing that, when the cable 16 of the present invention makes a turn to either the right or left in the plane of the cable, the relative orientation of the conductors will stay the same. Thus the ring conductors 232, 234 will always be on the top and bottom and the tip conductor 230 will always be in the center, thereby obviating any need for the installer to determine which of two conductors is tip and which is ring and install the plug or jack with the proper orientation.

I claim:

1. A two signal wiring system to provide on-site wiring of telephone and like two wire circuits in which wires to all components must have like proper orientation in order for the system to be functional, the said system comprising:

a three-wire flat cable formed by three elongate conductors in fixed parallel spaced relation within an extruded insulation, the outer conductors forming a first circuit and the central conductor forming a second circuit, the central conductor having a cross-sectional area substantially equal to the sum of the cross-sectional areas of said outer conductors; and at least one termination device having a front housing of insulative material defining a cable receiving rear face with at least two terminal receiving cavities opening on said rear face, a terminal received in each said cavity with at least one insulation piercing conductor engaging portion extending from said face, and a cover enclosing said rear face.

2. The system according to claim 1, wherein said cable is telephone cable having the center conductor as a tip signal and the outer conductors as the ring signals.

3. A system according to claim 1 wherein said insulation of said cable is colorless and transparent whereby an underlying surface will show through and terminations of said conductors can be inspected.

4. A system according to claim 1 further comprising: means to mount said cable on a surface.

5. A system according to claim 1 further comprising: an adhesive backing on said cable for mounting it on a surface.

6. A system according to claim 1 wherein said cable has a transverse profile which facilitates proper alignment of said conductors during formation of said cable by extrusion of said insulation.

7. A system according to claim 1 wherein one of said front housing and said cover has at least one integral mounting stud and the other of said front housing and said cover has a like number of apertures each positioned to receive a stud therein in friction fit for orientation and assembly purposes.

8. A system according to claim 1 further comprising: latching arms on one of said front housing and said cover and latching shoulders on the other of said front housing and said cover, said latching arms engaging respective latching shoulders to hold said front housings and said covers in an assembled condition.

9. A system according to claim 1 wherein each said front housing further defines:
a mating face oppositely directed from said rear face;
each said terminal cavity extending between said faces; and
each said terminal having a mating portion directed toward said mating face.

10. A system according to claim 1 wherein each said termination device is a telephone plug.

11. A system according to claim 1 wherein each said termination device is a telephone jack.

12. A system according to claim 1 wherein at least one of said termination devices is a splice having three terminals, each terminal capable of simultaneously engaging at least two of said cables.

13. A system according to claim 1 wherein each said terminal is an elongated conductive member having an insulation-piercing conductor-engaging portion at each end thereof.

14. A system according to claim 1 wherein one of said terminals has a pair of insulation-piercing conductor-engaging portions whereby both outside conductors of said cable are terminated by a single terminal.

15. A system according to claim 1 wherein said cover defines a cavity receiving a portion of said front housing therein.

16. A system according to claim 1 wherein said cover further defines means to mount said termination device.

17. A system according to claim 1 wherein said cover further defines a cable-receiving groove.

18. A system according to claim 1 wherein said cover further defines cavities receiving portions of said terminals therein.

* * * * *